J. W. BRIGGS.
BRACKET ATTACHMENT.
APPLICATION FILED MAR. 2, 1911.
1,019,421.
Patented Mar. 5, 1912.
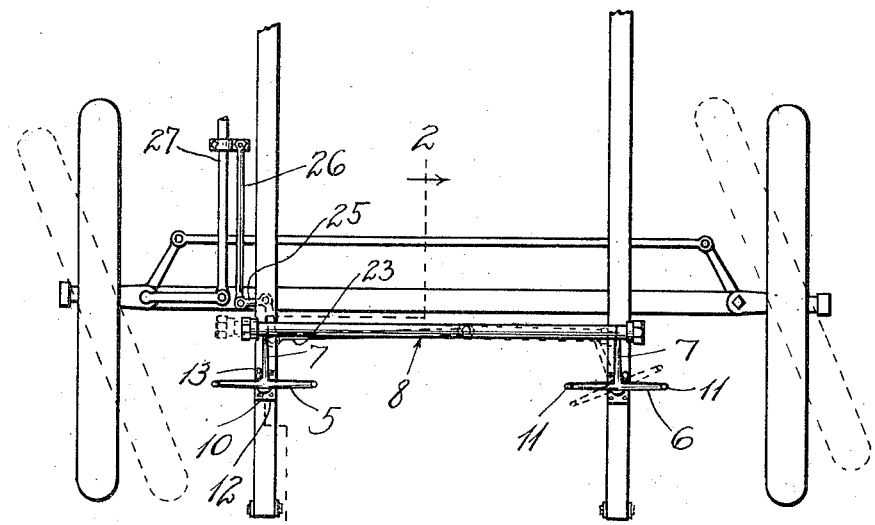
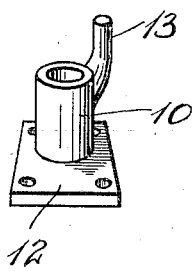
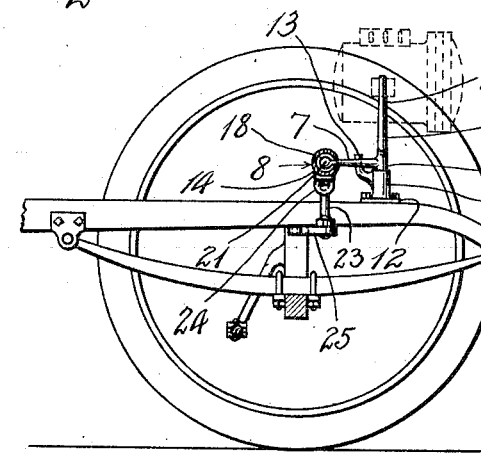
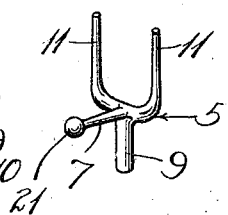
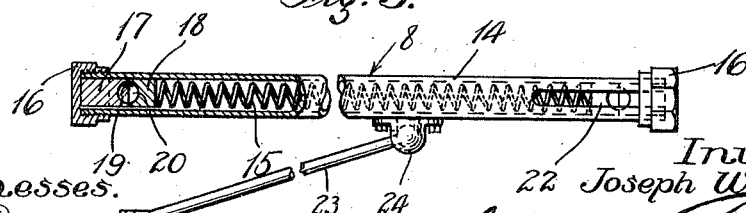
Witnesses.
E. R. Pollard
C. Severance
Inventor.
Joseph W. Briggs
Harard Strouse
Attys.

UNITED STATES PATENT OFFICE.

JOSEPH W. BRIGGS, OF REWARD, CALIFORNIA.

BRACKET ATTACHMENT.

1,019,421.  Specification of Letters Patent.  Patented Mar. 5, 1912.

Application filed March 2, 1911. Serial No. 611,772.

*To all whom it may concern:*

Be it known that I, JOSEPH W. BRIGGS, a citizen of the United States, residing at Reward, in the county of Kern and State of California, have invented new and useful Improvements in Bracket Attachments, of which the following is a specification.

This invention relates to improvements in lamp brackets or supporting means and has particular relation to the mounting of lamp brackets or supports for the brackets for vehicles and especially of automobiles.

It is an object of the invention to provide lamp supporting and controlling means for vehicles which may be so controlled as to throw a light ahead of the vehicle and yet be capable of throwing a light to one side to cover the ground of a curve when the vehicle is turning either to one side or the other.

It is an object of the invention to provide such a means so arranged that it can be controlled in accordance with the steering of automobiles or other vehicles upon which the appliance may be placed.

In the accompanying drawing forming a part of this specification, Figure 1 is a top plan view of the front part of the vehicle running gear, the improved lamp bracket being shown applied thereto. Fig. 2 is a vertical sectional view taken upon the line 2—2 of Fig. 1. Fig. 3 is an enlarged detail view partly in elevation and partly in section of the connecting rod connecting the lamp brackets upon opposite sides of the vehicle. Fig. 4 is a perspective view of a bracket, socket or support. Fig. 5 is a perspective view of one of the brackets without the supporting socket.

The parts of the invention will now be more particularly described reference being had to the drawing in which—

5 and 6 are lamp supporting brackets or yokes, and 7 are actuating arms projecting from said brackets, while 8 designates a connecting link or member interposed between the brackets and engaging the arms 7 for turning the brackets.

Each of the brackets is preferably formed with a depending standard 9 having suitable means to hold it in place, which standard engages a socket bearing 10 mounted in any desired manner upon the framing or other portion of the vehicle. Each bracket is formed with yoke arms 11 extending upwardly to which the lamp or other light to be supported is secured in any usual or well known manner. The socket bearings 10 are formed with securing bases 12 or other suitable means by which they may be riveted or bolted to the vehicle structure and projecting upwardly from the said sockets 10 are stop projections or arms 13 which extend into the path of the actuating arm 7 so as to limit the movement of said arms in the turning or manipulation of the lamp brackets.

The lamp brackets are preferably arranged so that one of the lamps carried thereby will always throw a light ahead while the other will be free to turn in the direction in which the vehicle is being turned for throwing a light in the new direction. The lamp which is turned is preferably the one on the short side of the curve so that if the vehicle is to be turned to the right the lamp upon the right side should turn in correspondence with the movement of the vehicle and if the vehicle is to be turned to the left the lamp on the left hand side should turn. For this reason the supporting sockets 10 are so arranged on the framing that the stop arms or projections 13 will be outside the arms 7 as clearly indicated in Fig. 1. Thus each lamp will be prevented from turning inwardly but can be turned so that the light will be thrown outwardly at the proper time.

The brackets are operated by the connecting link or member 8 which is preferably made up of a tubular casing 14 in which a spring as 15 is mounted. The ends of the tube 14 are closed by cap nuts 16 which hold in place outer and inner bearing blocks 17 and 18 respectively. The bearing blocks are made with opposing approximately semispherical sockets as 19 and 20 so that when the bearing blocks are brought together a suitable surrounding bearing is formed for inclosing bearings or balls 21 formed upon the ends of the arms 7.

The tubular casing 14 is formed with elongated slots as 22 for permitting of the movement of said tubular casing with respect to the arms 7 when one of the lamps is to be turned. The inner bearing blocks 18 will yield pressing the springs 15 backwardly when the arm 7 is held stationary against one of the stops 13. The pull on the outer bearing block 17, however will always be effective for drawing the arms 7 inwardly and turning the brackets with the lamps outwardly. The structure is such that when the connecting member or link 8 is moved in one direction, one of the arms 7 will engage a stop arm 13 and be held in a straightforward position as shown at 5 in Fig. 1. The other bracket as 6 can turn outwardly however, as indicated in dotted lines in said Fig. 1, the arm 7 of the bracket 5 moving in the slot 22 and compressing the spring 15 upon the other side of the vehicle. When the connecting member 8 is reciprocated in the opposite direction the action upon the parts will be reversed and the bracket 6 then will remain so as to hold its lamp squarely to the front, while the bracket 5 will be turned outwardly to follow the curve upon which the vehicle is to turn.

The member 8 is actuated in correspondence with the guiding of the vehicle and is therefore connected by suitable means with the steering mechanism of such vehicle. Thus a rod 23 is connected by a ball bearing 24 with the casing 14 at one end while the other end extends along beneath the bar 8 to a point where it is pivotally connected with a bell-crank lever 25 pivoted on the frame of the vehicle. A connecting rod 26 extends from the bell-crank 25 to bar 27 of the steering mechanism of the vehicle, which may be of any usual or well known type. Thus in steering the vehicle the lamps will be controlled as above described for throwing the light ahead and also in a curved direction upon the path of which the vehicle is to be turned.

It will be observed that the connecting member 8 may be connected with various kinds of steering mechanisms in common use by any system of bars and bell-cranks as preferred within the spirit of the invention.

The operation of the mechanism it is believed will be fully apparent from the above description and it will be observed that by operating the steering mechanism of a vehicle such as an automobile, one or the other of the lamps may always be made to throw the light to one side when the vehicle is to turn upon a curve while the other lamp will always be held squarely to the front so as to throw light in that direction.

What I claim is:—

1. A light supporting mechanism comprising pivoted brackets having actuating arms projecting therefrom, sockets for movably supporting the brackets, arms projecting from said sockets, for stopping one bracket against movement in one direction and the other bracket against movement in the other direction, yielding means interposed between the arms of said brackets, and means for reciprocating the said yielding means whereby one of the brackets may be turned when the other is held fixed and vice versa.

2. A lamp bracket mechanism for vehicles comprising lamp supporting yokes having depending pivots, sockets receiving said pivots, and having projections extending therefrom forming stops for limiting the movement of the yokes, actuating arms for turning the yokes, a connecting member intering the yokes and having bearposed between the arms and having bearings for movably engaging the ends thereof, yielding means interposed between the said arms and carried by said connecting member, and means for joining the said connecting member with the steering mechanism of the vehicle, whereby the lamp supporting yokes will be actuated in accordance with the guiding of the vehicle.

3. A lamp bracket mechanism comprising a plurality of brackets for lamps, means for pivotally supporting the same, the said brackets having arms by which they may be turned, a connecting member joining the free ends of said arms, stops projecting into the path of said arms upon their outer sides for preventing the lights from being turned inwardly, but admitting of their being turned outwardly, said connecting member being made up of a hollow casing, divided bearings mounted therein, a spring interposed between the inner parts of said dividing bearings and an arm connecting the said casing with the steering mechanism of the vehicle.

In witness that I claim the foregoing I have hereunto subscribed my name this 22 day of February, 1911.

JOSEPH W. BRIGGS.

Witnesses:
M. E. DOOLEY,
L. A. BRIGGS.